United States Patent [19]

Makati et al.

[11] Patent Number: 4,968,740
[45] Date of Patent: Nov. 6, 1990

[54] LATEX BASED ADHESIVE PREPARED BY EMULSION POLYMERIZATION

[75] Inventors: Ashok C. Makati; Do I. Lee; Bettye W. Greene; Robert T. Iwamasa, all of Midland, Mich.

[73] Assignee: The Dow Chemical Company, Midland, Mich.

[21] Appl. No.: 4,720

[22] Filed: Jan. 20, 1987

[51] Int. Cl.$^5$ ............................................... C08K 3/20
[52] U.S. Cl. ................................................... 524/501
[58] Field of Search .......................................... 524/501

[56] References Cited

U.S. PATENT DOCUMENTS

| | | |
|---|---|---|
| 2,425,840 | 8/1947 | Schulze et al. . |
| 4,013,824 | 3/1977 | Uraneck jet al. . |
| 4,064,377 | 12/1977 | Regan . |
| 4,134,872 | 1/1979 | Lee . |
| 4,145,494 | 3/1979 | Neubert . |
| 4,148,963 | 4/1979 | Bourrain et al. ............... 524/501 |
| 4,189,419 | 2/1980 | Takemoto et al. . |
| 4,237,257 | 12/1980 | Moriya et al. . |
| 4,325,856 | 4/1982 | Ishikawa et al. . |
| 4,405,746 | 9/1983 | Girgis ............................ 524/501 |
| 4,419,481 | 12/1983 | Schwartz . |
| 4,438,232 | 3/1984 | Lee . |
| 4,445,959 | 5/1984 | Hombach et al. . |
| 4,478,974 | 10/1984 | Lee et al. . |
| 4,508,864 | 4/1985 | Lee . |
| 4,537,916 | 8/1985 | Brunschtein et al. . |

FOREIGN PATENT DOCUMENTS 2137212 10/1984 United Kingdom .

Primary Examiner—Joseph L. Schofer
Assistant Examiner—Peter Mulcahy

[57] ABSTRACT

A latex based adhesive comprising a first component (adhesive component) comprising an interpolymer of at least one hard monomer, at least one soft monomer, and optionally a copolymerizable carboxylic acid comonomer having a Tg of from about −70° C. to about −5° C. and a second polymeric component (tackifier component) that is compatible with the adhesive component having a molecular weight less than 5,000 and a Tg from about −10° C. to about 50° C., both the adhesive component and tackifier component having been separately prepared by emulsion polymerization techniques.

5 Claims, No Drawings

LATEX BASED ADHESIVE PREPARED BY EMULSION POLYMERIZATION

BACKGROUND OF THE INVENTION

The present invention relates to an adhesive. More particularly, the present invention relates to such an adhesive having one polymeric component adapted to provide adhesive properties and another polymeric component adapted to provide tackifying properties. More particularly still, the present invention relates to such an adhesive wherein both the adhesive and tackifier components are separately prepared by emulsion polymerization.

Aqueous collodial dispersions of polymers, which are referred to in the art as latexes, are generally known to be useful as adhesives. A wide variety of adhesive formulations have been prepared that are specially adapted for particular uses. While latexes generally provide good adhesion to various substrates, it is often desirable to include a secondary component, generally a low molecular weight emulsified resin which is employed in order to provide initial stickiness or tack to the adhesive formulation. Such a component is referred to as a tackifier. Certain prior art adhesive formulations have included a latex based adhesive component such as a latex of a styrene/butadiene copolymer, and conventional tackifiers such as rosin esters, or other suitable tackifier, see e.g. U.S. Pat. No. 4,189,419. The properties of the adhesive composition may be adjusted by appropriate selection of both the type and amounts of tackifier or adhesive component employed in order to provide a resulting composition having the desired properties.

However, such adhesive formulations have certain undesirable properties. For example, the process for dispersing the tackifying resin adds unnecessary complexity and additional cost to the formulation. In addition, such formulations often demonstrate insufficient coalescence between resin particles and latex particles, thereby necessitating using excessive amounts of tackifier resin. This problem has been previously disclosed in U.S. Pat. No. 4,445,959, Column 12. Also, because relatively high levels of surfactant are required to disperse the tackifying resin adhesive properties are often detrimentally affected. Finally, under some conditions of high shear such as may be encountered during application of adhesives these previously known adhesive formulations may lack sufficient stability.

Techniques are already known for the preparation of low molecular weight polymers via free-radical, emulsion polymerization processes. Typically, such techniques include initiation by organic peroxides or inorganic persulfate compounds, and the use of large quantities of a suitable chain transfer agent such as a halogen compound, a mercaptan compound, or the like.

Latex based adhesive components, especially copolymers of styrene and butadiene are similarly known. Suitable examples of such adhesive components are disclosed in U.S. Pat. No. 4,419,481. The teachings of which are incorporated herein by reference.

In GB No. 2,137,212, there is disclosed a tackified S/B polymer adhesive made by preparing an emulsion polymerized adhesive component in the presence of an emulsion of a synthetic tackifier resin or rosin derivative.

In U.S. Pat. No. 4,438,232, a latex adhesive resin is disclosed. In U.S. Pat. Nos. 4,013,824, 4,064,377 and 4,145,494, emulsion processes for preparing polymers with a mercaptan as a chain transfer agent are disclosed.

It would be desirable to prepare by emulsion polymerization a latex of an ultra low molecular weight polymer suitable for use as a tackifying resin which does not require dispersing a solid polymer in water by use of surfactant.

In addition, it would be desirable to provide a latex based adhesive formulation which does not require the presence of a conventional, emulsified tackifier resin.

Finally, it would be desirable to provide an adhesive formulation wherein both the adhesive component and the tackifier component are prepared entirely by emulsion polymerization.

SUMMARY OF THE INVENTION

According to the present invention, there is now provided a latex based adhesive, the adhesive comprising at least two polymeric components, the first polymeric component (adhesive component) comprising a random interpolymer of at least one hard monomer and at least one soft monomer and optionally a copolymerizable carboxylic acid and having a glass transition temperature, Tg, of from about $-70°$ C. to about $-5°$ C., and the second polymeric component (tackifier component) that is compatible with the adhesive component, and having a number average molecular weight less than about 5,000 and a Tg from about $-10°$ C. to about $50°$ C., provided further that both the adhesive component and tackifier component have been separately prepared by emulsion polymerization techniques.

The latex based adhesive of the invention is particularly useful as a pressure sensitive adhesive for coating conventional substrates to form adhesive tapes, in the preparation of carpet backings and the like. It may also be employed as a laminating adhesive, such as in film to film laminations or film to paper laminations and in other adhesive applications.

DETAILED DESCRIPTION OF THE INVENTION

Desirably, the adhesive component comprises from about 95 to about 20 percent and the tackifier component comprises from about 5 to about 80 percent of the invented composition, measured on a dry weight basis.

As used herein, "glass transition temperature" (Tg) is determined by Dynamic Mechanical Spectroscopy (DMS) or by Differential Scanning Calorimetry (DSC) at a rate of $10°$ C./min utilizing a duPont 1090 model or equivalent calorimeter. Moreover, as used herein "compatibility" may be said to exist if respective polymers upon mixing demonstrate a single Tg or a narrowing of the difference in separately determined Tg's.

Molecular weights of polymers are measured by size exclusion chromatography (SEC) using a 2-4000 HXL and 1-2500 HXL column calibrated for low molecular weight polymers. Samples are prepared utilizing approximately 0.1 gram of polymer dissolved in 20 milliliters of tetrahydrofuran.

By the term "soft monomer" is meant addition polymerizable monomers which, if homopolymerized, would yield a homopolymer having a glass transition temperature (Tg) less than $25°$ C. Suitable examples of "soft monomers" include esters of unsaturated acids and saturated alcohols having from 3 to 15 carbons, such as n-butyl acrylate, 2-ethylhexyl acrylate, cyclohexyl acrylate, butyl methaorylate, etc.; and conjugated aliphatic dienes having from 4 to 12 carbons such as 1,3- butadiene, 2-methyl-1,3-butadiene, pentadiene, 2-chloro-1,3-butadiene, etc. Preferred soft monomers are n-butyl acrylate and 1,3-butadiene. A most preferred soft monomer is 1,3-butadiene.

By the term "hard monomers" is meant addition polymerization monomers other than carboxylic acids, which if homopolymerized, would yield a homopolymer having a Tg greater than 25° C. Suitable examples of hard monomers include esters of unsaturated acids having from 3 to 10 carbons such as tert-butyl acrylate, methyl methacrylate, tert-butyl methacrylate, etc.; and $C_{8-16}$ monovinylidene aromatic monomers such as styrene, α-methylstyrene, vinyl toluenes, bromostyrene, etc. A preferred hard monomer is styrene.

Suitable copolymerizable carboxylic acids are $C_{2-10}$ ethylenically unsaturated carboxylic acids such as itaconic acid, acrylic acid, maleic acid and the like. A preferred copolymerizable carboxylic acid is itaconic acid.

Preferably, the tackifier component comprises an interpolymer of at least one hard monomer and optionally one or more soft monomers as well as a copolymerizable ethylenically unsaturated carboxylic acid. In a highly preferred embodiment, the tackifier component is prepared by emulsion polymerization of the soft and hard monomers, and optionally a carboxylic acid containing monomer in the presence of a large quantity of chain transfer agent. By the term "large quantity" is meant a sufficient quantity of chain transfer agent to provide a latex of a interpolymer having a molecular weight of less than about 5000. As used herein, molecular weights are determined by the techniques of hydrodynamic chromatography. Suitable chain transfer agents include carbon tetrachloride, bromoform, and alkyl or aralkyl mercaptans having about 2 to 20 carbons. Preferred chain transfer agents are aliphatic mercaptans containing from about 8 to about 20 carbon atoms. A highly preferred aliphatic mercaptan is tertiary dodecyl mercaptan. Desirably, the chain transfer agent is employed in an amount from about 1 percent to about 20 percent by weight, preferably from about 5 to about 15 percent by weight based on reacted monomer weight.

Respective amounts of monomers are employed in the polymerization to prepare a tackifier component comprising from about 30 percent to about 100 percent by weight hard monomer, from about 70 percent to about 0 percent soft monomer and up to about 10 percent of a copolymerizable carboxylic acid. A preferred composition comprises from about 60 to about 90 percent hard monomer, 40 to 10 percent soft monomer, and 1 to 5 percent carboxylic acid. As used throughout the specification and claims, such values are based on total ethylenically unsaturated monomer content of the polymer latex and exclude polymerized mercaptan content. A most preferred tackifier component comprises an interpolymer of styrene, butadiene and an unsaturated carboxylic acid. The number average molecular weight of the tackifier component is preferably from about 1,000 to about 4,000.

Suitable adhesive component interpolymers comprise from about 30 to about 90 percent soft monomer from about 70 to about 10 percent hard monomer and optionally up to about 10 percent of a copolymerizable carboxylic acid comonomer. A preferred composition comprises from about 50 to about 80 percent soft monomer, from about 50 to about 20 percent hard monomer, and about 1 to about 5 percent unsaturated carboxylic acid. The foregoing percentages are based on total ethylenically unsaturated monomer weight. The adhesive component is most preferably an interpolymer of styrene, butadiene and a copolymerizable carboxylic acid. A mercaptan, if present, is employed in an amount from about 0.01 to about 5.0 percent of the adhesive component.

The adhesive component may additionally comprise a crosslinking monomer such as divinyl benzene, trimethylol propane triacrylate, etc.

The adhesive and tackifier components of this invention may be prepared using conventional emulsion polymerization techniques. Thus, for example, the monomers and chain transfer agent employed are typically dispersed with agitation sufficient to emulsify the mixtures in an aqueous medium containing known emulsifying agents (i.e, surfactants) as well as other ingredients conventionally employed in the art as polymerization aids (e.g., chelating agents, seed latex, bactericides, antifoamants, etc.). Such monomers are then subjected to polymerization with the aid of a conventional source for generating free radicals, such as free radical initiators, activating radiation, etc. The polymerization may be conducted in continuous, or batch mode.

The final product is prepared by combining the respective components utilizing conventional compounding or blending equipment. Additional conventional additives such as plasticizers, surfactants, fillers, antioxidants, pigments, thixatropic aids, flow aids, etc. may also be incorporated into the finished formulation.

Having described the invention, the following examples are provided as further illustrative of the invention and are not to be construed as limiting. Unless otherwise indicated, all parts, percentages, and ratios herein are based on dry solids weight.

EXAMPLE 1 (TACKIFIER)

(a) A monomer feed charge was prepared comprising 98 parts of styrene, 10 parts t-dodecyl mercaptan and 5 parts of carbon tetrachloride.

(b) A second monomer feed charge was prepared comprising 18.7 parts of water, 2 parts of itaconic acid and 0.14 part of sodium hydroxide.

(c) An aqueous feed charge was prepared comprising 22.0 parts of water, 0.5 parts sodium dodecyl benzene sulfonate surfactant, and 0.7 parts sodium persulfate.

POLYMERIZATION PROCESS

To a one gallon stainless steel reactor having an agitator and several inlets for the addition of the aforementioned charges was added 61.0 parts of deionized water, 0.01 part of a 1 percent solution of the trisodium salt of N-(hydroxyethyl) ethylene diamine triacetic acid (chelant), 3.5 part of a 305 Angstrom number average diameter, 96:4 weight ratio styrene/acrylic acid copolymer latex. The reactor was purged with nitrogen, agitated at 350 rpm and heated to 90° C. Monomer feed charge (a) was added to the reactor, beginning at time=0 minutes over a total period of 390 minutes. After 15 minutes, monomer charge (b) was added over a total period of 330 minutes. Charge (c) was added to the reactor beginning at time t=0 for a total of 330 minutes. After complete addition of all charges reaction was continued at 90° C. under nitrogen atmosphere for one hour.

The resulting latex (styrene/itaconic acid =98/2) contained 10 percent t-dodecyl mercaptan and 5 percent carbon tetrachloride remnants and had apparent number average molecular weight 1,600.

EXAMPLE 2

In a manner similar to Example 1, ultra low molecular weight latex particles were prepared with a monomer composition of 78 parts styrene, 20 parts butadiene and 2 parts itaconic acid. The content of t-dodecyl mercaptan was 10 percent. Carbon tetrachloride remnant content was 5 percent.

EXAMPLES 3-7

Additional tackifier components were prepared by a continuous conadd emulsion process similar to that disclosed in Example 1 excepting that a mixture of styrene and butadiene monomers was charged as monomer charge (a). The amounts of monomers were varied to provide the polymer compositions indicated in Table I. Monomer charge (a) containing styrene and butadiene in total equivalent amounts equal to the equivalent of styrene used in Example 1 along with carbon tetrachloride and t-dodecyl mercaptan was added to the reactor, beginning at time t=0 minutes for a total of 270 minutes. Remaining charges (b) and (c) are as previously described. Charge (b) was added to the reactor beginning at time t=15 minutes for a total of 210 minutes. Charge (c) was added to the reactor beginning at time t=0 for a total of 300 minutes. Following addition of all feed streams, the reactor contents were agitated for an additional 60 minutes at 90° C. under nitrogen atmosphere The reactor was cooled and the resulting latex recovered. Results of the polymerization are contained in Table I.

TABLE I

| Example | Feed Monomer Ratio Styrene/Butadiene/Itaconic Acid | Chain Transfer Agent Content (%) | | Apparent Number Average Molecular Weight |
|---|---|---|---|---|
| | | t-dodecyl mercaptan | CCl4 | |
| 3 | 78/20/2.0 | 10 | 5 | 2,200 |
| 4 | 68/30/2.0 | 10 | 5 | 2,400 |
| 5 | 58/40/2.0 | 10 | 5 | 2,600 |
| 6 | 88/10/2.0 | 15 | 5 | 1,330 |
| 7 | 88/10/2.0 | 20 | 5 | 1,100 |

EXAMPLE 8 (TACKIFIER COMPONENT)

Monomer charge (a) was prepared comprising 68 parts of styrene, 30 parts of butyl acrylate and 2 parts of t-dodecyl mercaptan.

Monomer charge (b) was prepared comprising 18.0 parts of deionized water, 2.0 parts of itaconic acid and 0.22 parts of sodium hydroxide.

Charge (c) was prepared comprising 16.0 parts of deionized water, 0.18 parts of sodium hydroxide, 1.0 parts of sodium dodecyl benzene sulfonate surfactant, and 1.5 parts of sodium persulfate

POLYMERIZATION PROCESS

To a one gallon stainless steel reactor having an agitator and several inlets for addition of the aforementioned charges were added 77.0 parts of deionized water, 0.01 parts chelant, 10.0 parts of carbon tetrachloride and 3.5 parts of a 305 Angstrom number average diameter, 96:4 weight ratio styrene/acrylic acid copolymer seed latex. The reactor was purged with nitrogen, agitated at 350 rpm and heated to 90° C. Charge (a) was added to the reactor at time t=0 for a total of 270 minutes, charge (b) was added to the reactor beginning at t=0 for total of 6 minutes. Charge (c) was added to the reactor beginning at time t=0 for a total of 270 minutes. Reaction was continued for one hour at 90° C. following complete addition of all the charges.

EXAMPLE 9

The procedure of Example 8 is repeated excepting that a mixture of styrene, butadiene and butyl acrylate monomers is employed as charge (a). Results are contained in Table II.

TABLE II

| | Monomer Ratio in Feed | | | | Chain Transfer Agent Content (%) | Apparent Number Average Molecular Weight |
|---|---|---|---|---|---|---|
| Example | Styrene | Butadiene | Butyl Acrylate | Itaconic Acid | | |
| 8 | 68 | 0 | 30 | 2 | 2 | 3,800 |
| 9 | 68 | 20 | 10 | 2 | 2 | 3,300 |

EXAMPLE 10

A carboxylated styrene/butadiene latex was prepared by the continuous feed polymerization of 70 parts butadiene, 28 parts styrene, 2 parts itaconic acid, 2.25 parts t-dodecyl mercaptan, and 3.0 parts carbon tetrachloride. The resulting latex had a particle size of about 1050 Angstroms.

EXAMPLE 11

A carboxylated styrene/butadiene latex is prepared essentially according to the method of Example 1, excepting that the amount of t-dodecyl mercaptan was measured to 2-75 parts. The resulting latex had a particle size of about 1050 Angstroms.

EXAMPLE 12

A carboxylated styrene/butadiene latex is prepared substantially according to the technique of Example 10, excepting that 65 parts of butadiene, 33 parts styrene, 2 parts itaconic acid, 2 parts t-dodecyl mercaptan and 3 parts of carbon tetrachloride were employed. The resulting latex had a particle size of 1050 Angstroms.

Property Testing

Several tests were used to evaluate the adhesion of various formulations to specific substrates as well as for specific end-use applications.

(a) Adhesion to Specific Substrates: In this method, a substrate to which adhesion is to be determined is secured to a glass plate using double-sided adhesive tape. Two parallel strips of double-sided adhesive tape are then attached to the substrate approximately 6 inches apart. The adhesive is applied in an even film to the exposed surface of the substrate between the strips of tape. A reinforcing material (i.e., cheese cloth) is laid evenly over the adhesive and the strips of double-sided adhesive tape. The composite is allowed to dry for 24 hours and then conditioned overnight at a constant temperature of 70°-72° F. and 50 percent relative humidity. One inch wide strips are cut between the strips of adhesive tape. The cheese cloth and the given substrate are separated at the double-sided tape and inserted in opposite jaws of an Instron ® adhesion tester. Peel adhesion (180°) is then measured at peel rates of 2 inch/min and 20 inch/min.

Several adhesive systems were formulated and evaluated by test method (a) to determine adhesion to untreated polypropylene film (Mobil Bicor ® 278T). Results are contained in Table III.

TABLE III

| Latex | Peel Adhesion (lbs/inch) |
|---|---|
| Example 11 | 1.9 |
| Example 11/- Example 2* | 4.5 |

*blended in a 60/40 ratio

The results indicate that improved peel adhesion is obtained by a blend of an adhesive component and a tackifier component according to the invention.

Adhesion Test for Film To Paper Laminates: This test is used to determine the performance of a given adhesive system for film to paper or paperboard laminated structures. Adhesive is applied to a 7×14 inch unbleached Alabama Kraft ® paperstock (20 point). The adhesive is drawn down in the cross machine direction using a #31 mayer rod. After the adhesive is drawn down, the untreated side of a polypropylene film (Mobil 278T) is placed on the wet adhesive without applying pressure. The laminate is allowed to air dry for 24 hours at room temperature. Then several ¼" cuts are made on the laminates in the machine direction. The laminate is attached in a horizontal position and the film edge is held between the thumb and index finger and pulled by hand in a direction about 135° to the horizontal plane. Two rates of pull, a slow rate (approximately 180 inches/minutes) and a fast rate (approximately 720 inches/minutes) at two temperatures 40° F. and 72° F. are employed.

The method of bond failure is then evaluated. Fiber tear (FT) is determined by the presence of fiber particles on the separate film surface. Adhesive failure (AF) indicates clean separation of either the paperboard or the film from the adhesive layer while cohesive failure (CF) indicates separation of the adhesive layer into two or more portions.

The same adhesive system which were evaluated for basic adhesion to untreated polypropylene film were evaluated by test method (b) to determine the adhesive ability to bond untreated polypropylene film to paperboard. Results are contained in Table IV.

TABLE IV

| | 72° F. | | 40° F. | |
|---|---|---|---|---|
| Adhesive System | Slow Pull | Fast Pull | Slow Pull | Fast Pull |
| Example 10 | AF | AF | AF | AF |
| Example 11/- Example 2* | FT | FT | FT | FT/AF |

*blended in a 60/40 ratio

Inspection of the data in the above table shows that the adhesive component by itself does not give suitable fiber tear properties. However, when such components are formulated with a tackifier component according to the invention, the resulting adhesive demonstrates that a system can effectively bond untreated polypropylene film to other substrates such as paper stock or paperboard.

(c) 180° Peel Adhesion Test for Film-Paper Laminates: Laminates are prepared as described in the above section (b). One inch wide cuts are made through the film and the paperboard. The films are pulled on an Instron ® adhesion tester at 180° with a rate of pull of 12 inch/min at room temperature. The force required to effect destruction of the bond is recorded along with the mode of failure.

Film/Paper Adhesion

Several adhesive systems were evaluated by test method (c) to determine adhesion between corona treated film (Oppalyte ® TW-3 available from Mobil Chemicals, Inc.) and paperboard substrates. Sample portions of film were coated with various adhesive formulations. Results are contained in Table V.

TABLE V

| Adhesive | 180° Peel Adhesion (lbs/in) |
|---|---|
| Example 12 | 480 |
| Example 12/- Example 3 (50/50) | 600 |
| Example 12/- Example 4 (50/50) | 900 |
| Example 12/- Example 5 (50/50) | 640 |
| Example 12/- Example 6 (50/50) | 780 |
| Example 12/- Example 7 (50/50) | 850 |
| Example 12/PS* (50/50) | 570 |

*Comparative, PS is a low molecular weight polystyrene dispersion tackifier, Piccolastic A-75, available from Hercules, Inc.

The results of the above testing indicate that adhesion equally or even exceeding that obtainable utilizing conventional adhesive formulation technology utilizing conventional tackifiers can be obtained according to the present invention.

(d) Adhesive Test for Film to Film Laminates: This method consists of applying the adhesive to primary film substrate and drawing it down the web using a #3 mayer rod, which is equivalent is applying approximately 0.5 to 0.7 lbs. per/1000 ft₂. This structure is then dried in a forced air oven for approximately three minutes. A secondary film substrate is applied over the coated web. A sheet of paper is placed over the laminate to protect it and an iron set at low heat (surface temperature approx. 150° F.) is run across the paper with mild hand pressure. Laminates are cut into 1" width strips and tested by the T-peel test (ASTM D-1876-72) at 12 inch/min. The resulting force is reported in lbs (force)/inch.

An adhesive system was evaluated by test method (d) to determine adhesive performance in film to film laminations. Accordingly, two corona treated polypropylene films (Mobil T278) are laminated by the above procedure. T-peel adhesion results are contained in Table VI.

TABLE VI

| Adhesive System | T-Peel Adhesion (gms/in) |
|---|---|
| Example 12 | 200 |
| Example 12/- Example 3* | 425 |

*Blended in a 40/60 ratio (e) Pressure Sensitive Adhesive Test: The adhesive properties of a candidate pressure sensitive adhesive were measured according to the Pressure Sensitive Tape Council (PSTC) Procedure Nos. 1, 5 and 7. The peel adhesion test involved peeling the tape at a 180 degree angle after application under relatively heavy pressure. The quick stick test involved peeling the tape off at a 90 degree angle after application under a relatively light pressure. Both tests are reported as the force required to remove the tape. Shear adhesion is measured according PSTC No. 7 using a 500 grams (g) mass at 120° F. In this test, a shear force of 2 degree angles is applied in an oven. The results are reported as the time required for the bond to fail at a given temperature.

Several adhesive systems were evaluated by test method (e) to determine pressure sensitive adhesive properties. Tests were conducted at 72° F. Results are contained in Table VII.

TABLE VII

| Adhesive Formulation | Peel Adhesion (lbs/in) | Quick Stick (lbs/in) | Shear (Hours) |
| --- | --- | --- | --- |
| Example 13 | 1.8 | 0.8 | >100 |
| Example 13 Example 3 (60/40) | 3.6 | 1.2 | 80 |
| Example 13 Conven. Tackifier (60/40)* | 3.6 | 1.4 | >100 |
| Example 13/- Conven. Tackifier (60/40)** | 3.0 | 1.6 | 25 |

*Comparative, polystyrene tackifier Piccolastic A075, available from Hercules, Inc.
**Comparative, polystyrene tackifier, Piccolastic A-50, available from Hercules, Inc.

The above results indicate the present invention is suitable for preparing pressure sensitive adhesives having good properties.

What is claimed is:

1. An adhesive comprising: (1) an adhesive component comprising a random interpolymer of at least one hard monomer and at least one soft monomer, having a Tg of from about −70° C. to about −5° C., and (2) a tackifier component that is compatible with the adhesive component, having a number average molecular weight less than about 5,000 and a Tg from about −10° C. to about 50° C. wherein both the adhesive component and tackifier component have been separately prepared by emulsion polymerization techniques.

2. An adhesive according to claim 1, wherein the adhesive component comprises from about 95 percent to about 20 percent of the latex and the tackifier component comprises from about 5 percent to about 80 percent of the latex, such percentages being measured on a dry weight basis.

3. An adhesive according to claim 1, wherein the hard monomer in each component is styrene and the soft monomer in each component is butadiene.

4. An adhesive according to claim 1, wherein the tackifier component has a number average molecular weight from about 1,000 to about 4,000.

5. An adhesive according to claim 1, wherein the adhesive and tackifier components comprise interpolymers of styrene, butadiene and itaconic acid.

* * * * *